United States Patent
Serroyen et al.

(10) Patent No.: US 7,366,276 B2
(45) Date of Patent: Apr. 29, 2008

(54) METHOD AND APPARATUS FOR TRANSFERRING SIGNALING MESSAGES

(75) Inventors: Gert Serroyen, Schelle (BE); Gery Verwimp, Borgerhout (BE)

(73) Assignee: Siemens Aktiengesellschaft, Munich (DE)

( * ) Notice: Subject to any disclaimer, the term of this patent is extended or adjusted under 35 U.S.C. 154(b) by 667 days.

(21) Appl. No.: 11/011,745

(22) Filed: Dec. 14, 2004

(65) Prior Publication Data

US 2005/0238150 A1    Oct. 27, 2005

(30) Foreign Application Priority Data

Dec. 16, 2003   (EP)   .................. 03029037

(51) Int. Cl.
*H04J 3/12*   (2006.01)
*H04J 1/14*   (2006.01)
*H04Q 11/00*  (2006.01)

(52) U.S. Cl. .............. 377/522; 370/377; 370/385; 370/496

(58) Field of Classification Search .......... None
See application file for complete search history.

(56) References Cited

U.S. PATENT DOCUMENTS 5,825,860 A    10/1998   Moharram 7,103,068 B1 *  9/2006   Gardner et al. ............. 370/468
7,145,875 B2 * 12/2006   Allison et al. ........... 370/230.1

OTHER PUBLICATIONS

International Telecommunication Union, "Signalling connection control part procedures", ITU-T Recommendation Q.714, Jul. 1996, pp. 1-29, XP-002248417.

* cited by examiner

*Primary Examiner*—Ronald Abelson
(74) *Attorney, Agent, or Firm*—Bell, Boyd & Lloyd LLP

(57) ABSTRACT

The present invention provides a novel method for transferring SCCP messages to one of a plurality of entities in an entity set. The method receives a SCCP message from which a traffic type for said received message is determined. A global title associated with said received message is then translated to a destination entity set. For each entity in the destination entity set, a maximum allowed rate for receiving messages of said traffic type at that entity and a current rate for transferring messages of said traffic type to that entity are determined. The method then determines a subset of entities for which the current rate is smaller than or equal to the maximum allowed rate. If the subset contains at least one entity, the method selects one entity from the subset and transfers the SCCP message to said selected entity. The invention also provides an advanced signaling transfer point STP.

20 Claims, 1 Drawing Sheet

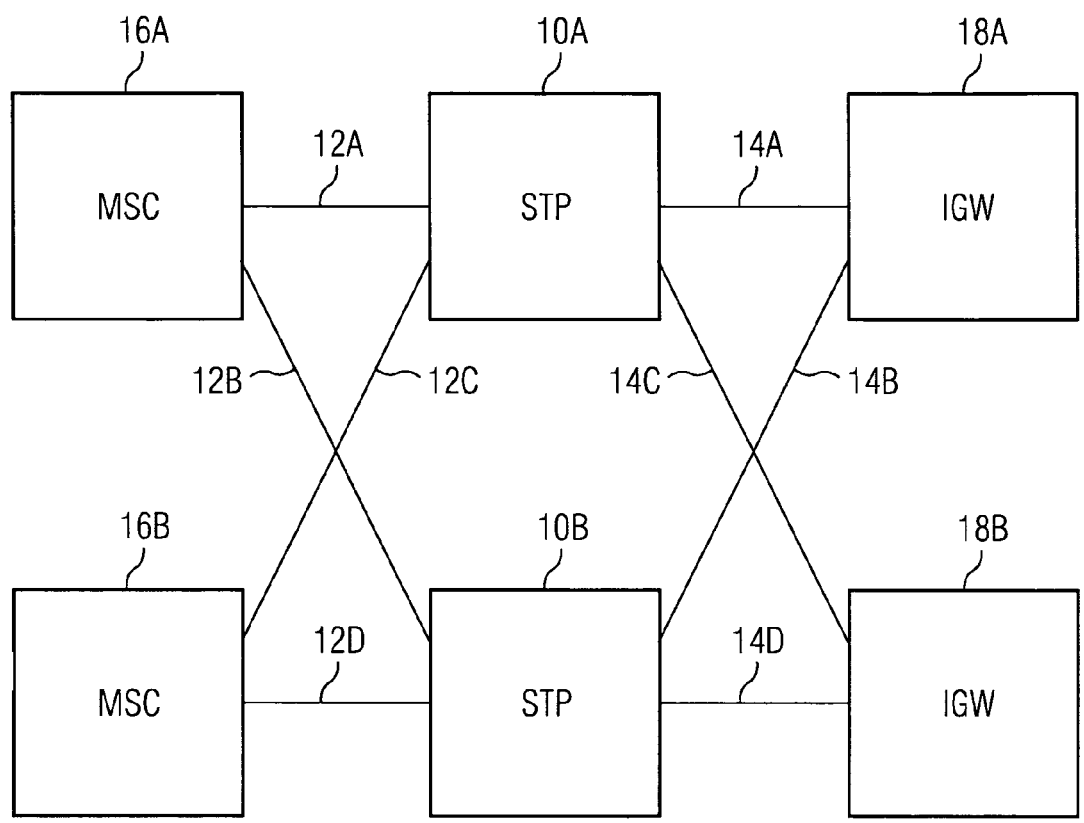

METHOD AND APPARATUS FOR TRANSFERRING SIGNALING MESSAGES

CROSS REFERENCE TO RELATED APPLICATIONS

This application claims priority to the European application No. 03029037.3, filed Dec. 16, 2003 and which is incorporated by reference herein in its entirety.

FIELD OF INVENTION

The present invention relates to an optimized method and apparatus for transferring signaling messages in a communications network. More particularly, the present invention relates to an optimized method and a signaling transfer point for transferring signaling messages in a Signaling System 7 network.

BACKGROUND OF INVENTION

Modern communications networks generally carry two types of traffic or data. The first is the traffic which is transmitted by or delivered to a user or subscriber, and which is usually paid for by the user. That type of traffic is widely known as user traffic or subscriber traffic. The second is the traffic caused by network management applications in sending and receiving management data from network elements, known as management traffic.

In telecommunications, the management traffic is also known as signaling traffic. The term "signaling" refers to the exchange of signaling messages between various network elements such as database servers, local exchanges, transit exchanges and user terminals. A well known protocol for transferring such signaling messages is the Signaling System 7 (SS7), also referred to as Common Channel Signaling System 7 (CCS7).

The Signaling System 7 as specified by the International Telecommunication Union (ITU) in the Q.700-series standards provides for all signaling tasks in today's telecommunications networks. More specifically, SS7 provides for example for:
- basic call setup, management, and tear down;
- enhanced call features such as call forwarding, calling party name/number display, and three-way calling;
- accounting and billing;
- database operations for services such as authentication, roaming, local number portability (LNP), toll-free services and special tariff services;
- network management for the SS7 network and its connections; and
- non-call related signaling, allowing for services such as short message service (SMS) and user-to-user signaling (UUS).

The Signaling System 7 forms an independent network, in which SS7 messages are exchanged between network elements over bidirectional channels called signaling links. Signaling occurs out-of-band on dedicated channels rather than in-band on channels reserved for user traffic such as voice. Compared to in-band signaling, out-of-band signaling provides:
- faster call setup times;
- more efficient use of voice circuits; and
- support for Intelligent Network (IN) services which require signaling to network elements without voice trunks (e.g., database systems).

The elements of a SS7 network are known as signaling points, each uniquely identified by a signaling point code. Point codes are carried in signaling messages exchanged between signaling points to identify the source and destination of each message. Each signaling point uses a routing table to select the appropriate signaling path for each message.

There are three kinds of signaling points in a SS7 network: Service Switching Points (SSPs), Signaling Transfer Points (STPs), and Service Control Points (SCPs)

SSPs are switches that originate, terminate, or tandem calls. An SSP sends signaling messages to other SSPs to setup, manage, and release voice circuits required to complete a call. An SSP may also send a query message to a centralized database (an SCP) to determine how to route a call (e.g., a toll-free call). An SCP sends a response to the originating SSP containing the routing number(s) associated with the dialed number.

Network traffic between signaling points may be routed via signaling transfer points (STPs). An STP routes each incoming message to an outgoing signaling link based on routing information contained in the SS7 message. Because it acts as a network hub, an STP provides improved utilization of the SS7 network by eliminating the need for direct links between signaling points. An STP may perform global title translation, a procedure by which the destination signaling point is determined from digits present in the signaling message (e.g., the dialed 800 number, calling card number, or mobile subscriber identification number).

The SS7 uses a protocol stack, in which the hardware and software functions of the SS7 protocol are divided into functional abstractions called "levels". These levels map loosely to the Open Systems Interconnect (OSI) 7-layer model defined by the International Standards Organization (ISO).

The lower three levels are known as the Message Transfer Part (MTP). MTP Level 1 defines the physical, electrical, and functional characteristics of the digital signaling link. MTP Level 2 ensures accurate end-to-end transmission of a message across a signaling link. MTP Level 3 provides message routing between signaling points in the SS7 network.

In SS7, functions are provided by so called user parts. A widely used user part is the ISDN User Part (ISUP) which defines the protocol used to set-up, manage, and release trunk circuits that carry user traffic between terminating line exchanges (e.g., between a calling party and a called party). In some countries, the less sophisticated Telephone User Part (TUP) performs these tasks.

Another protocol in SS7, the Signaling Connection Control Part (SCCP), provides connectionless and connection-oriented network services and global title translation (GTT) capabilities above MTP Level 3. SCCP is used as the transport layer for TCAP-based services.

The Transaction Capabilities Applications Part (TCAP) supports the exchange of non-circuit related data between applications across the SS7 network using the SCCP connectionless service. Queries and responses sent between SSPs and SCPs are carried in TCAP messages. In mobile networks, TCAP carries Mobile Application Part (MAP) messages sent between mobile switches and databases to support user authentication, equipment identification, and roaming.

Problematically, congestion control methods as implemented in previous SCCP stacks only provide for traffic limitation if either the bandwidth of a link or the processing capability at a destination is exceeded. With such congestion control methods, high-bandwidth traffic associated with one service may severely affect other, more important services.

Furthermore, the signaling traffic transferred in a signaling network is subject to a complex set of accounting and billing rules leading to well-compensated traffic types and less profitable signaling traffic. Some traffic types are necessary to provide control information for optimal network performance. As a consequence, network operators wish to assign priorities to the various types of signaling traffic accordingly to ensure optimal network performance and to achieve a profitable balance between well-compensated traffic types and non-compensated traffic types.

SUMMARY OF INVENTION

It is, therefore, an object of the present invention to provide an optimized method for transferring signaling messages.

It is another object of the present invention to provide an optimized apparatus for transferring signaling messages.

In accordance with the foregoing objectives, there is provided by the invention a method for transferring SCCP messages, comprising the steps of:

receiving a SCCP message, determining a traffic type for said received SCCP message, translating a global title associated with said received SCCP message to a destination entity set, wherein the destination entity set is comprised of entities capable of handling messages of said traffic type, determining, for each entity in the destination entity set, a maximum allowed rate for receiving messages of said traffic type at that entity and a current rate for transferring messages of said traffic type to that entity, determining a subset of entities for which the current rate is smaller than or equal to the maximum allowed rate, and if the subset contains at least one entity, selecting one entity from the subset and transferring the SCCP message to the entity selected.

In accordance with the present invention there is also provided a Signaling Transfer Point STP for transferring signaling messages in a SS7 network, comprising:

connecting means for bidirectionally connecting to a plurality of SS7 links (12, 14), each of said SS7 links linking the STP (10) other SS7 entities (16, 18), means for determining a traffic type for SCCP messages received via said SS7 links, at least one global title translator for translating global title information associated with received messages to destination entity sets, wherein the each destination entity set is comprised of entities capable of handling messages of a specific traffic type, means for determining, for each entity (16, 18) in a destination entity set, a maximum allowed rate for receiving messages of said traffic type at that entity and a current rate for transferring messages of said traffic type to that entity, means for determining a subset of entities for which the current rate is smaller than or equal to the maximum allowed rate, and means for selecting one entity from the subset and means transferring the SCCP message to said selected entity.

One advantage of the invention is that the transfer of SCCP messages to sets of entities or destinations can be based on traffic types. By assigning each entity in each of the sets of entities a maximum allowed rate for received traffic and transferring messages only to entities for which the current rate does not exceed the maximum rate, there is implemented an advanced method for transferring SCCP messages capable of controlling the SCCP message rate per entity or destination based on the traffic type.

In one preferred embodiment, determining the traffic type is based on evaluating a parameter of the Mobile Application Part (MAP). More particularly, the parameter "MAP application context" can be used for effectively distinguishing several types of SCCP messages in a communications system carrying signaling messages associated with mobile subscribers. SCCP traffic associated with mobile subscribers includes roaming traffic (e.g., location update requests), short message service (SMS) traffic, and traffic related to international calls.

In this embodiment, the invention provides an effective means for controlling the various traffic types. On each SS7 link outgoing to a Signaling Transfer Point, the invention therefore allows for an optimally balanced traffic mix ensuring network stability and revenue. The invention can, for example, be used to limit the traffic associated with SMS messages to prevent SMS traffic from blocking other traffic.

In the following, the invention will be described in more detail in the form of an embodiment which is better understood in accordance with the enclosed FIGURE.

BRIEF DESCRIPTION OF THE DRAWING

The sole FIGURE shows an exemplary section of a typical SS7 network comprising Mobile Switching Centers (MSC) 16 connected to International Gateway Exchanges (IGW) 18 via Signaling Transfer Points (STP) 10 by means of signaling links 12, 14.

DETAILED DESCRIPTION OF INVENTION

The arrangement is such that each MSC 16 is connected to each STP 10. More particularly, a first MSC 16A is connected to a first STP 10A via a first SS7 link 12A and to a second STP 10B via a second SS7 link 12B. Similarly, a second MSC 16B is connected to the first STP 10A via a third SS7 link 12C and to the second STP 10B via a fourth SS7 link 12D.

The arrangement further provides for a connection of each IGW 18 to each STP 10. More particularly, a first IGW 18A is connected to the first STP 10A via a fifth SS7 link 14A and to a second STP 10B via a second SS7 link 14B. Similarly, a second IGW 18B is connected to the first STP 10A via a seventh SS7 link 14C and to the second STP 10B via an eighth SS7 link 14D.

Either or both of the STPs 10 are configured to implement the inventive method. Upon receiving an SCCP message at the STP 10, the received message is analyzed and Global Title (GT) data is extracted. Where the GT data is sufficient to determine a traffic type for the SCCP message, no further analysis of the SCCP message is necessary. Otherwise, further information may be obtained from the SCCP message to allow for determining the traffic type of the SCCP message.

In one embodiment of the present invention, the following parameters are read from the SCCP message:

sccp message type, sccp calling party address, comprising: Routing Indicator (RI), Signaling Point Code (SPC), Subsystem Number (SSN), GT data comprising: Translation Type (TT), Numbering Plan (NP), Nature of Address (NA), GT digits, and SCCP Called Party Address (CdPA) (SPC and SSN).

In a SS7 network carrying messages associated with mobile subscribers, a parameter of the Mobile Application Part (MAP) known as the MAP application context is also read from the SCCP message.

Based on some or all of these parameters, a determination is made to which destination the message is to be transferred. Destinations may include local destinations, i.e., destinations associated with the STP 10 performing the transfer such as local SCCP subsystems, and remote destinations, e.g., either of the SS7 nodes 16A-B or 18A-B.

In many network arrangements, including the network arrangement according the FIGURE, two or more destinations may be arranged in redundant configurations which has a positive impact on network service availability. In the FIGURE, for example, a transaction directed to the first IGW 18A may also be handled by the second IGW 18B and vice versa.

Additionally, to improve system performance and to further improve system reliability, modern SS7 nodes may include a plurality of subsystems for performing similar tasks. In terms of SCCP, each of these subsystems is a "destination".

These "destinations" are more precisely termed entities since the term "destination" in SS7 traditionally refers to nodes having a unique Destination Point Code (DPC), which is a MTP Level 3 addressing scheme. However, multiple SCCP entities may reside in one SS7 node.

SCCP entities are grouped into entity sets. In general, an entity set comprises SCCP entities that share a common property. This common property may, for example, be the ability to receive specific SCCP messages, e.g., messages of a specific traffic type.

The actual process of making said determination to which destination the message is to be transferred is also referred to as Global Title Translation (GTT). In an advantageous STP 10 there is implemented a two-step Global Title Translation (GTT) procedure. The first step is the actual translation of the global title, comprising the following steps:

Selecting a GT partition (a GT partition is a section of the GT database that is applicable for the traffic type). This step involves analyzing some or all of the SCCP parameters mentioned above. Note that most of these parameters are not considered in the relevant standards. The standard requirements only include the following parameters: SCCP GT CdPA parameters (TT, NP, NA and GT digits). If no matching GT partition can be identified, a default partition is selected.

This selection process can, for example, be used to distinguish between traffic types by selecting the parameters for evaluation accordingly.

Searching for an applicable GT translator. A GT translator is a standard SCCP object. This search employs the following parameters, as proposed in the relevant standards: SCCP called party address, GT translation type (TT), GT numbering plan (NP) and GT nature of address (NA).

There can be at most one GT translator with specific TT, NP and NA parameters per GT partition to avoid ambiguity. However, a given GT translator may be associated with several GT partitions (e.g., when two traffic types must be routed the same way). If no matching GT translator is found, this represents a routing error.

Identify a matching GT rule. A GT rule is another standard SCCP object, which is attached to a single GT translator. A GT rule contains digit information. The identification process involves matching GT rule digit information with the digits of the SCCP called party address obtained from the SCCP message. In general, the GT rule with the most matching digits is selected.

As an example, consider the following GT rules: 123 and 1234. For a first exemplary incoming message having CdPA digits 123567, the first GT rule would be selected. For a second exemplary incoming message having CdPA digits 1234567, the second GT rule would be selected (1234 in this case has more matching digits than 123).

As a result of this first step of the global title translation process there is provided a selection determining an appropriate one of the several entity sets available. In general, SCCP entity sets can be referenced by several GT rules from any GT translator or GT partition. Entities can in turn appear in several entity sets.

In the network configuration depicted in the FIGURE, an exemplary first destination entity set may be defined as follows:

$$ES_1=\{IGW_1;IGW_2\}$$

where the first IGW 18A is a first entity $IGW_1$ and the second IGW 18B is a second entity $IGW_2$. In this example, the direction of transfer is assumed to be from the MSCs 16 to the IGWs 18. It is further assumed that this first entity set is determined, by step 1 of the translation process as described above, as the suitable entity set for handling a first traffic type for a given global title.

A second destination entity set, $ES_2$, may be defined as:

$$ES_2=\{IGW_1; IGW_2\}.$$

In this example, the second entity set, $ES_2$, comprises the same entities as the first entity set, $ES_1$, but is assumed to be determined as the suitable entity set for handling a second traffic type for a given global title.

A third destination entity set, $ES_3$, may be defined as:

$$ES_3=\{IGW_{1,1}; IGW_{1,2}; IGW_{2,1}; IGW_{2,2}\}$$

where $IGW_{1,1}$ and $IGW_{1,2}$ are subsystems of the first IGW which are both capable of handling the request associated with a specific global title translation. Similarly, $IGW_{2,1}$ and $IGW_{2,2}$ are subsystems of the second IGW which are also both capable of handling that request. For example, such configurations may prove useful in environments where reliability or performance requirements cannot be achieved by simply sharing the load among the two IGW nodes 18A and 18B. In the present example, a third traffic associated with the global title translation leading to $ES_3$ may be of higher priority or higher bandwidth requirements or both.

Note that, for explanatory purposes, the parameter assumed to (exclusively) determine the selection of either the first, second, or third entity sets is the traffic type, which in turn may be calculated from a plurality of other parameters. In many implementations, other characteristics obtainable from a plurality of parameters, such as those described in conjunction with a SCCP message, may influence the global title translation process, wherein the global title translation may yield one entity set for each parameter combination of course, as mentioned earlier, for some parameter combinations the global title translation may yield an entity set which is also associated with one or more other parameter combinations.

As part of the invention, there may be implemented in an inventive STP a storage medium as a means for determining a maximum allowed rate for each entity in an entity set. This parameter may be administratively provided by an operator for storing in said storage medium. In an alternate embodiment, the maximum allowed rate is stored with the respective entity and queried by means of signaling messages.

Note that, as a practical consequence, this maximum allowed rate can be used in one preferred embodiment to provide one maximum allowed rate for each traffic type per entity. This can be achieved by implementing the global title translation process such that a first traffic type will be handled by a first entity set, a second traffic type will be handled by a second entity set etc, as explained in the example above.

For the exemplary entity sets $ES_{1\ldots3}$, the following TABLE I gives an example of how to associate maximum allowed rates (Max Rate and Current Rate in message signaling units (MSU) per second):

TABLE I

| Entity Set | Entity | Type | OpStat | Max Rate | Current Rate |
|---|---|---|---|---|---|
| $ES_1$ | $IGW_1$ | primary | available | 1000 | 800 |
| $ES_1$ | $IGW_2$ | backup | available | 500 | 200 |
| $ES_2$ | $IGW_1$ | primary | congested | 200 | 100 |
| $ES_2$ | $IGW_2$ | backup | available | 200 | 100 |
| $ES_3$ | $IGW_{1,1}$ | primary | available | 400 | 420 |
| $ES_3$ | $IGW_{1,2}$ | primary | unavailable | 200 | 0 |
| $ES_3$ | $IGW_{2,1}$ | backup | unavailable | 400 | 0 |
| $ES_3$ | $IGW_{2,2}$ | backup | congested | 200 | 0 |

TABLE I also specifies an administrative "Type" or priority parameter for each entity, which in the example can be either "primary" or "backup" to indicate which of the entities is to be selected primarily and which of the entities function(s) as a hot stand-by. Other implementations may allow further priority levels. Further, there is provided an operational status (OpStat) for each entity, which can, for example, be obtained from SCCP or MTP management functions. If an entity is unavailable or congested, no messages must be transferred to that entity. Other operational statuses may exist for a given implementation.

Finally, TABLE I also indicates the current rate at which messages are currently being transferred to a given entity.

The information presented in tabular form in TABLE I is available in an inventive STP in the following manner. The values for type and max rate and the grouping of entities into sets are, for example, administratively provided in a system database, while the operational status is continuously monitored by management functions. The current rate is, for example, available at the processing platforms that perform the message transfer function in the STP.

That information is now input to step two of the overall global title translation process. This second step is the routing of a GT translated message to a suitable entity. In detail, a suitable entity is selected as follows:

For all entities in the entity set, determine which entities are available and not congested. (It is prohibited to transfer messages to unavailable or congested entities.) Note that this step is optional in implementations where, for example, unavailable or congested entities are removed from the respective entity sets until service is restored.

The following are the results for the example described above: If the translation result was $ES_1$: $\{IGW_1, W_2\}$. If the translation result was $ES_2$: $\{IGW_2\}$. If the translation result was $ES_3$: $\{IGW_{1,1}\}$.

Obtain a current rate. Compare to maximum rate. Create subsets of entities for which the current rate is smaller than the maximum rate (optionally with a safety margin, which may also be calculated into the maximum rate).

The following subsets are obtained for the example: If the translation result was $ES_1$: $\{IGW_1, IGW_2\}$. If the translation result was $ES_2$: $\{IGW_2\}$. If the translation result was $ES_3$: $\{\ \}$ (empty set).

If the subset is non-empty, select an entity. If the subset contains only one entity, transfer the message to that entity. If a subset contains several entities, the selection may in one embodiment be based on the priority associated with the entities. For example, select among the entities of a subset that entity with highest priority. Among entities with equal priorities, select an entity which is further away from becoming saturated (i.e., for which the current rate is smallest in comparison to the respective maximum rate).

The final step of the selection process yields for the example: If the translation result was $ES_1$: $\{IGW_1\}$. If the translation result was $ES_2$: $\{IGW_2\}$. If the translation result was $ES_3$: $\{\ \}$.

If the subset is empty, i.e. $\{\ \}$, that is, the message cannot be routed because no entity is currently able to handle (additional) traffic, apply some form of error handling. Either of the following strategies may be employed: discard message and do not send notification to an origination of the message, discard message and send notification, or return message to origination.

Note that the order of the following steps:

determining availability and congestion status, and creating subsets of entities for which the current rate is less than the maximum rate are interchangeable. Both orders have advantages, and it depends on the actual computing platform employed in an STP 10 which order will prove more advantageous.

The present invention can be used advantageously in managing international SS7 links. These constitute a scarce and expensive resource. International SS7 links typically carry traffic related to international roaming and, more specifically, traffic related to international calls (e.g., setup and tear down), mobility management procedures (e.g., location update procedures and authentication) and services such as messaging (e.g., SMS). If the GTT process is set up such that the international destinations appear as entities in entity sets, and that entities are selected by GTT based on the message traffic type, a network operator can obtain an optimal traffic mix for maximizing both service availability and revenue by assigning the maximum allowed rate for each entity appropriately.

The traffic-type specific rate control thereby achieved by one embodiment of the invention therefore provides a means for fine tuning the network in terms of controlling traffic according to traffic type considerations while previous solutions such as the SCCP congestion management only provided for control irrespective of traffic types. The traffic-type specific rate control may also by used to prevent the traffic associated with one application from consuming all available bandwidth, which would result in network congestion affecting all applications.

It shall be noted that the network arrangement described above is exemplary only. The inventive method and apparatus can be deployed in other network arrangements without departing from the spirit of the present invention. Also, even though messages, services and protocols associated with mobile applications were used to illustrate the invention, it is understood that the invention is usable in all SS7 signaling environments without departing from the scope of the invention.

The invention claimed is:

1. A method for transferring SCCP (Signaling Connection Control Part) messages, comprising the steps of:
    receiving a SCCP message;
    determining a traffic type for said received SCCP message;
    translating a global title associated with said received SCCP message to a destination entity set, wherein the destination entity set is comprised of entities capable of handling messages of said traffic type;
    determining, for each entity in the destination entity set, a maximum allowed rate for receiving messages of said traffic type at that entity and a current rate for transferring messages of said traffic type to that entity;
    determining a subset of entities for which the current rate is smaller than or equal to the maximum allowed rate; and
    selecting one entity from the subset and transferring the SCCP message to the entity selected if the subset contains at least one entity.

2. The method according to claim 1, further comprising the step of discarding the SCCP message if the subset contains no entities.

3. The method according to claim 2, further comprising the step of sending an indication to an origination of the SCCP message indicative of discarding of said SCCP message.

4. The method according to claim 1, further comprising the step of returning the SCCP message to an origination of said SCCP message.

5. The method according to claim 1, wherein the step of selecting one entity from the subset of entities comprises:
    determining, from a SCCP management function, for each entity in the subset, a priority parameter, an availability status and a congestion status; and
    selecting one entity among all available and non-congested entities based upon the priority parameter.

6. The method according to claim 2, wherein the step of selecting one entity from the subset of entities comprises:
    determining, from a SCCP management function, for each entity in the subset, a priority parameter, an availability status and a congestion status; and
    selecting one entity among all available and non-congested entities based upon the priority parameter.

7. The method according to claim 3, wherein the step of selecting one entity from the subset of entities comprises:
    determining, from a SCCP management function, for each entity in the subset, a priority parameter, an availability status and a congestion status; and
    selecting one entity among all available and non-congested entities based upon the priority parameter.

8. The method according to claim 4, wherein the step of selecting one entity from the subset of entities comprises:
    determining, from a SCCP management function, for each entity in the subset, a priority parameter, an availability status and a congestion status; and
    selecting one entity among all available and non-congested entities based upon the priority parameter.

9. The method according to claim 5, wherein the step of selecting one entity further comprises selecting, among all available and non-congested entities having substantially equal priorities as indicated by the priority parameter, that entity for which the current rate is smallest compared to the maximum allowed rate.

10. The method according to claim 1, wherein the step of determining the traffic type of said received message comprises evaluating a Mobile Application Part (MAP) application context parameter.

11. The method according to claim 2, wherein the step of determining the traffic type of said received message comprises evaluating a Mobile Application Part (MAP) application context parameter.

12. The method according to claim 3, wherein the step of determining the traffic type of said received message comprises evaluating a Mobile Application Part (MAP) application context parameter.

13. The method according to claim 4, wherein the step of determining the traffic type of said received message comprises evaluating a Mobile Application Part (MAP) application context parameter.

14. The method according to claim 5, wherein the step of determining the traffic type of said received message comprises evaluating a Mobile Application Part (MAP) application context parameter.

15. A Signaling Transfer Point for transferring signaling messages in a SS7 network, the Signaling Transfer Point comprising:
    connecting mechanisms for bidirectionally connecting to a plurality of SS7 links, each of said SS7 links linking the Signaling Transfer Point other SS7 entities;
    mechanisms for determining a traffic type for SCCP messages received via said SS7 links;
    at least one global title translator for translating global title information associated with received messages to destination entity sets, wherein the each destination entity set is comprised of entities capable of handling messages of a specific traffic type;
    mechanisms for determining, for each entity in a destination entity set, a maximum allowed rate for receiving messages of said traffic type at that entity and a current rate for transferring messages of said traffic type to that entity;
    mechanisms for determining a subset of entities for which the current rate is smaller than or equal to the maximum allowed rate; and
    mechanisms for selecting one entity from the subset and means transferring the SCCP message to said selected entity.

16. The Signaling Transfer Point according to claim 15, wherein the mechanisms for selecting one entity from the subset of entities include:
    mechanisms for determining, from a SCCP management function, for each entity in the subset, a priority parameter, an availability status and a congestion status; and
    mechanisms for selecting one entity among all available and non-congested entities based upon the priority parameter.

17. The Signaling Transfer Point according to claim 16, further comprising mechanisms for selecting, among all available and non-congested entities having substantially equal priorities as indicated by the priority parameter, that entity for which the current rate is smallest compared to the maximum allowed rate.

18. The Signaling Transfer Point according to claim 15, further comprising mechanisms for determining the traffic type of received SCCP messages from a Mobile Application Part (MAP) application context parameter.

19. The Signaling Transfer Point according to claim 16, further comprising mechanisms for determining the traffic type of received SCCP messages from a Mobile Application Part (MAP) application context parameter.

20. The Signaling Transfer Point according to claim 17, further comprising mechanisms for determining the traffic type of received SCCP messages from a Mobile Application Part (MAP) application context parameter.

* * * * *